United States Patent [19]

Lin et al.

[11] 4,277,382

[45] Jul. 7, 1981

[54] STABLE AQUEOUS EMULSION OF REACTIVE POLYSILOXANE AND CURING AGENT

[75] Inventors: Kingso C. Lin; Donald J. Hammond, both of Newark, Ohio

[73] Assignee: Owens-Corning Fiberglas Corporation, Toledo, Ohio

[21] Appl. No.: 83,019

[22] Filed: Oct. 9, 1979

[51] Int. Cl.$^3$ .............................................. C08L 83/06
[52] U.S. Cl. .............................. 260/29.2 M; 428/378; 428/447; 428/450; 525/477
[58] Field of Search ............. 260/29.2 M; 106/287.16, 106/287.13; 252/310; 428/378, 391; 525/477

[56] References Cited

U.S. PATENT DOCUMENTS

| | | | |
|---|---|---|---|
| 4,100,124 | 7/1978 | Ichikawa et al. | 260/29.2 M |
| 4,167,501 | 9/1979 | Rooks | 260/29.4 R |

OTHER PUBLICATIONS

*Dow Corning New Product Information Brochure.*

*Primary Examiner*—Theodore E. Pertilla
*Attorney, Agent, or Firm*—Ronald C. Hudgens; Philip R. Cloutier; James B. Wilkens

[57] ABSTRACT

A curable coating composition comprising a polysiloxane resin having at least two silanol groups or groups readily hydrolyzable thereto, a non-resinous silane reactable with at least two such groups for curing the polysiloxane resin and a catalyst can be stablilized against gelation by emulsifying the polysiloxane resin with a nonionic or anionic surfactant and emulsifying the catalyst with a polycarbinolpolysiloxane substantially free of silanol groups and groups readily hydrolyzable thereto, the non-resinous silane curing agent being coemulsified together with either or both of the other components. This composition is particularly useful as a coating for glass fibers to be used in elevated temperature environments.

12 Claims, No Drawings

STABLE AQUEOUS EMULSION OF REACTIVE POLYSILOXANE AND CURING AGENT

TECHNICAL FIELD

This invention relates to aqueous emulsions of curable polysiloxane resin compositions, to the stabilization of such emulsions against gelation by suitable selection of surfactants, to the method of forming such emulsions, to the use of such compositions for coating articles such as glass fibers and to the articles so coated.

BACKGROUND ART

The use of polysiloxanes in coating compositions, including both aqueous emulsions and solutions, is well known. Such coating compositions are particularly desirable where the coated article will be subjected to elevated temperatures, since many polysiloxanes are more resistant to thermal degradation than are most polymers having carbon atoms in their backbone.

For many applications it is desirable that the coating composition be cured by a suitable cross-linking reaction after application to the substrate. For polysiloxanes this can be accomplished by the reaction of at least two silanol groups on the polysiloxane with at least two hydroxyl or alkoxy groups linked to a silicon atom of a silane cross-linking agent having at least two such reactive functional groups per molecule thereof.

These curing reactions are known to be catalyzed by certain organo metallic compounds, such as alkyltin salts of fatty acids. Where such active catalysts have hitherto been employed in such coating compositions, the stability of the liquid coating composition has been seriously compromised by premature gelation. This has sometimes been overcome by substituting less active organozinc compounds for the more highly active organotin catalysts, thereby extending the pot life of the liquid coating composition, but at the cost of requiring higher temperatures and/or longer times to effect satisfactory cure of the coating on the substrate.

SUMMARY OF THE INVENTION

The present invention provides a curable polysiloxane coating composition in the form of an aqueous dispersion or emulsion which is stable for extended periods at normal ambient conditions, even when it contains as catalyst a highly active organotin compound.

In one of its aspects, the invention is a method of producing a gelation resistant aqueous emulsion of a polysiloxane resin having at least two functional groups selected from silanol groups and groups readily hydrolyzable thereto, a non-resinous silane reactable with at least two of said functional groups for curing said polysiloxane resin and a catalyst, said method comprising: (a) dispersing said polysiloxane resin, and optionally said silane, in a first aqueous medium with a nonionic or anionic first surfactant to form a polysiloxane resin emulsion; (b) dispersing said catalyst, and optionally said silane, in a second aqueous medium with a second surfactant comprising a polycarbinolpolysiloxane substantially free of silanol groups or groups readily hydrolyzable thereto, to form a catalyst emulsion; and (c) mixing said polysiloxane resin emulsion and said catalyst emulsion together; where said silane is included in at least one of steps (a) and (b).

In another of its aspects, the invention is a gelation resistant aqueous emulsion composition comprising a polysiloxane resin having at least two functional groups selected from silanol groups and groups readily hydrolyzable thereto, a silane reactable with at least two of said functional groups for curing said polysiloxane resin and a catalyst, wherein said polysiloxane resin is emulsified with a nonionic or anionic first surfactant, said catalyst is emulsified with a second surfactant comprising a polycarbinolpolysiloxane substantially free of silanol groups or groups readily hydrolyzable thereto and said silane is emulsified with at least one of said first and second surfactants.

In yet another of its aspects, the invention is a glass fiber, or a strand containing a number of glass fibers, coated and/or impregnated with the dried and cured non-volatile residue of the aqueous emulsion composition described above.

In a still further aspect, the invention is a fabric containing the coated glass fiber or strand described above.

DESCRIPTION OF PREFERRED EMBODIMENTS

The polysiloxane resin used in the present invention can be any water insoluble polysiloxane resin having the requisite reactive silanol groups or groups readily hydrolyzable thereto and otherwise suitable for the desired application. Silanol terminated linear polydimethyl- or polyphenylmethyl- or polymethylvinyl-siloxanes are readily available and suitable for most applications. Such polysiloxane resins of widely varying molecular weights may be used; e.g., resins having viscosities from about 2,500 to about 500,000 centistokes are useful.

The surfactant for dispersing the polysiloxane resin may be almost any nonionic or anionic surfactant which will not produce undesirable properties in the ultimate use of the final product nor interact deleteriously with other components, especially other surfactants, of the aqueous dispersion. Nonionic surfactants are preferred. Alkoxylated alkylphenols are particularly suitable for many applications.

The silane curing agent can be any non-resinous organosilane which will react with at least two of the silanol groups or alkoxysilane or other hydrolyzable groups of the polysiloxane resin so as to cross-link or cure that resin. Silanes of the type $R_mSi(OR')_{4-m}$, where R is a monovalent organic radical having a carbon atom at the point of attachment, R' is H or a lower alkyl group and m is a number from 1 to 2, are generally suitable with m=1 being generally preferred. Many such silanes are commercially available.

The catalyst can be any of the known catalysts for condensation reactions of silanols or groups hydrolyzable to silanol groups, so long as the catalyst is not water soluble so that it may be segregated from the polysiloxane resin in the aqueous composition by being separately emulsified. As indicated above, a number of organometallic compounds are known to be effective as curing catalysts. Among them are zinc, lead, chromium, tin and iron compounds. In the practice of the present invention, the tin compounds are preferred because they are highly active catalysts even at low temperatures. Organotin compounds which are liquid are more readily dispersed than are crystalline compounds. Particularly preferred are liquid dialkyltin salts of fatty acids, such as dibutyltin dilaurate.

The surfactant for emulsifying the catalyst comprises a polycarbinolpolysiloxane, preferably one having primary carbinol groups, which is substantially free of silanol groups or groups readily hydrolyzable to silanol groups. A particularly suitable polycarbinolpolysiloxane is DOW CORNING ® Q2-8026 Silicone Polycarbinol Fluid, which has a structure represented by the formula:

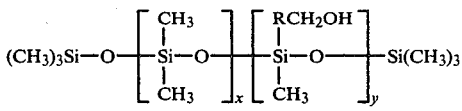

where R is a divalent organic radical having a carbon atom at its point of attachment to Si, x has a value such that the viscosity is about 465 centistokes and the molecular weight is about 2400, and y is about 3.

The silane curing agent may be emulsified together with either the polysiloxane resin or the catalyst or with both, so long as the polysiloxane resin and the catalyst are separately emulsified so as to remain substantially segregated in the emulsion composition, in order that stability against gelation of that composition may be realized despite the presence therein of curable reactants and an active catalyst.

Other conventional components such as thickeners, additional surfactants, defoamers, antistatic agents, colorants, etc., may be present in the aqueous emulsion composition so long as they do not interfere with the stability of the separate emulsification of the polysiloxane resin and the catalyst.

The proportions of the various components in the aqueous emulsion composition of this invention may vary over substantial ranges, depending on the particular selection of specific materials and the purpose for which the composition is to be used. Ordinarily, a total concentration of non-volatile components from about 10 to about 60 percent by weight will be found convenient.

The relative proportions of silane curing agent and polysiloxane resin can vary greatly, depending primarily on the molecular weight of the polysiloxane resin and the functionality of the curing agent, relatively greater proportions of curing agent being required to effect satisfactory cure where the molecular weight of the polysiloxane resin is low or the functionality of the curing agent is small; typical weight ratios of silane curing agent to polysiloxane resin are from about 5:100 to about 50:100, the range from about 10:100 to about 20:100 being preferred.

The relative proportion of catalyst to the combined total of both polysiloxane resin and silane coupling agent may vary widely. Weight ratios from about 1:100 to about 20:100 are typical, the range from about 2:100 to about 10:100 being generally preferred, especially where the catalyst is an organotin compound.

The relative proportion of nonionic or anionic surfactant to polysiloxane resin may also vary widely, but weight ratios from about 1:100 to about 20:100 are typically useful, with the range from about 5:100 to about 10:100 being preferred. Similarly, the relative proportions of polycarbinolpolysiloxane surfactant and catalyst may vary widely, but again weight ratios from about 1:100 to about 20:100 are generally useful, the range from about 5:100 to about 10:100 being again preferred. Somewhat greater amounts of either surfactant may be required where the silane curing agent is to be also emulsified with that surfactant.

The gelation resistant aqueous emulsion compositions of this invention can be prepared by first preparing separate aqueous emulsions of the polysiloxane resin and the catalyst, using a nonionic or anionic surfactant and a surfactant comprising the polycarbinolpolysiloxane respectively as emulsifiers and incorporating the silane curing agent in at least one of these preliminary emulsions. These polysiloxane resin and catalyst emulsions can then be simply mixed together in appropriate proportions.

The preliminary emulsions can be formed using any conventional method and apparatus. Most simply, water may be placed in a container having a stirrer or other agitator, the surfactant added with agitation and finally the components to be emulsified added and dispersed with agitation sufficient to form an emulsion. To form emulsions having smaller particle sizes, more surfactant and/or more intensive agitation during dispersion will be required. Only very moderate agitation is required for mixing together the preliminary emulsions.

The resulting aqueous emulsion composition may be used for coating a wide variety of substrates, including metal and glass. It is particularly useful for coating glass fibers or multifiber strands of glass fibers, where the glass fibers may first be coated with a very light coating of a sizing composition for glass fibers, which conventionally comprises a film-forming resin, a lubricant and a coupling agent, and may be applied as a solution or emulsion in any suitable volatile liquid, water being generally preferred, and subsequently dried. The aqueous emulsion composition of the present invention may be applied to glass fibers using any conventional process. Where it is to be applied as an impregnant to a multifiber strand so as to more or less fill the interstices of the strand and bind the individual fibers thereof together as well as coating the outside of the strand, it is generally advantageous to bend the strand while it is in contact with the aqueous composition so as to separate the fibers to permit more rapid and complete penetration of the liquid composition throughout the strand. This may be accomplished by drawing the strand across a roll or bar wet with or immersed in the liquid composition. A coating weight of about 5 to about 20% nonvolatiles, based on the weight of the glass fibers, is generally preferred.

The wet coated fibers may be heated to dry and cure the coating. Where such active catalysts as the organotin compounds are employed, even the moderate temperatures, e.g., about 100° to 300° C., effective for drying the wet coatings may also be effective for curing the dried coating. Where less active catalysts are employed, higher temperatures may be required to effect cure in acceptable times.

The coated glass fibers of this invention may be formed into fabric by any conventional technique such as felting or weaving. Such fabric is particularly adapted for uses where elevated temperatures are encountered because of the exceptional thermal stability of the cured polysiloxane resin coating. Such uses include filter bags for removing particulate material from hot gas streams and drier fabrics for paper making machines.

The following example will illustrate a preferred embodiment of the invention.

EXAMPLE 1

An aqueous catalyst emulsion was formed by mixing 511.5 g of DOW-CORNING Q2-8026 Silicone Fluid (described above) and 102.3 g of methyltrimethoxysilane. To this is added 511.5 g of dibutyltin dilaurate and the mixture was stirred for 15 minutes. 250 g deionized water was then added slowly with vigorous mixing, the viscosity increasing sharply during the addition. After several minutes further mixing, another 778 g of deionized water was added with continued mixing. The resulting catalyst emulsion had a viscosity of about 350 centipoise and a pH of about 3.8.

A polysiloxane resin emulsion was formed by emulsifying about 8000 g of a polydimethylsiloxane resin having two terminal-$Si(CH_3)_2OH$ groups and a viscosity of about 60,000 centistokes with about 640 g of a 30/70 mixture of Igepal C0630/Igepal C0850, both being polyethoxylated alkylphenols nonionic surfactants available from GAF Corporation and having cloud points of about 130° F. and greater than 212° F., respectively, in about 7350 g of deionized water. To this emulsion was added 870 g of vinyltrimethoxysilane with slow stirring.

The catalyst emulsion was then added to the polysiloxane resin emulsion with slow stirring and 3.8 g of DOW-CORNING Antifoam B was added to the final mixture. This aqueous emulsion composition had a viscosity of 60 centipoises and a pH of 5.1 and was stable for about three months at room temperature.

This composition was applied to sized glass fiber strand as an impregnant and coating by immersing the strand in a body of the composition as the strand was drawn over a submerged roll to open the strand so as to facilitate thorough penetration by the liquid composition. This strand was dried and cured at oven temperatures ranging from 100° C. to 300° C., plied into yarns and woven into fabric by conventional means. The fabric so formed was particularly useful as a drier fabric for paper making machines, in which use it was exposed to elevated temperatures.

It will be evident to those skilled in the art that numerous modifications can be made to the present invention and these are contemplated as being within the scope of the invention.

We claim:

1. A method of producing a gelation resistant aqueous emulsion suitable for coating glass fibers and comprising a polysiloxane resin having at least two functional groups selected from silanol groups and groups readily hydrolyzable thereto, a non-resinous silane reactable with at least two of said functional groups for curing said polysiloxane resin and a catalyst, said method comprising:

(a) dispersing said polysiloxane resin, and optionally said silane, in a first aqueous medium with a non-ionic or anionic first surfactant to form a polysiloxane resin emulsion;

(b) dispersing said catalyst, and optionally said silane, in a second aqueous medium with a second surfactant comprising a polycarbinolpolysiloxane substantially free of silanol groups or groups readily hydrolyzable to silanol groups, to form a catalyst emulsion; and (c) mixing said polysiloxane resin emulsion and said catalyst emulsion together; where said silane is included in at least one of steps (a) and (b).

2. A method according to claim 1 wherein said polysiloxane resin has at least two terminal silanol groups.

3. A method according to claim 1 wherein said silane has at least two lower alkoxy groups attached to a silicon atom.

4. A method according to claim 1 wherein said catalyst comprises an organotin compound.

5. A method according to claim 4 wherein said organotin compound is a liquid dialkyltin salt of a fatty acid.

6. A method according to claim 1 wherein said first surfactant is nonionic.

7. A gelation resistant aqueous emulsion composition suitable for coating glass fibers and comprising a polysiloxane resin having at least two functional groups selected from silanol groups and groups readily hydrolyzable thereto, a silane reactable with at least two of said functional groups for curing said polysiloxane resin and a catalyst, wherein said polysiloxane resin is emulsified with a nonionic or anionic first surfactant, said catalyst is emulsified with a second surfactant comprising a polycarbinolpolysiloxane substantially free of silanol groups or groups readily hydrolyzable thereto and said silane is emulsified with at least one of said first and second surfactants.

8. A composition according to claim 7 wherein said polysiloxane resin has at least two terminal silanol groups.

9. A composition according to claim 7 wherein said silane has at least two lower alkoxy groups attached to a silicon atom.

10. A composition according to claim 7 wherein said catalyst comprises an organotin compound.

11. A composition according to claim 10 wherein said organotin compound comprises a liquid dialkyltin salt of a fatty acid.

12. A composition according to claim 7 wherein said first surfactant is nonionic.

* * * * *